United States Patent [19]

Ogaki et al.

[11] 4,402,555

[45] Sep. 6, 1983

[54] TRACK-TYPE VEHICLE UNDERCARRIAGE

[75] Inventors: Koji Ogaki, Yokohama; Yukio Tamura; Masashi Kaminishi, both of Hiratsuka; Yoshinori Takata, Isehara, all of Japan

[73] Assignee: Kabushiki Kaisha Komatsu Seisakusho, Tokyo, Japan

[21] Appl. No.: 190,337

[22] Filed: Sep. 24, 1980

[30] Foreign Application Priority Data

Sep. 28, 1979 [JP] Japan .......................... 54/133270[U]
Sep. 28, 1979 [JP] Japan .......................... 54/133271[U]
Sep. 28, 1979 [JP] Japan .......................... 54/133272[U]
Sep. 28, 1979 [JP] Japan .......................... 54/133273[U]
Sep. 28, 1979 [JP] Japan .......................... 54/133274[U]

[51] Int. Cl.³ ............................................. B62D 55/12
[52] U.S. Cl. ........................................ 305/11; 305/25; 305/24; 305/32; 305/52; 305/57
[58] Field of Search ................................. 305/10-11, 305/16-18, 22, 24-26, 31-32, 52, 58 R, 56-57

[56] References Cited

U.S. PATENT DOCUMENTS 1,363,756 12/1920 Ruppert ......................... 305/18 X
1,488,629 4/1924 Wick ................................. 305/25
4,099,795 7/1978 Roley .
4,120,537 10/1978 Roley et al. .
4,191,431 3/1980 Roley et al. .

FOREIGN PATENT DOCUMENTS 1345767 10/1962 France .............................. 305/18

Primary Examiner—Charles A. Marmor
Attorney, Agent, or Firm—Armstrong, Nikaido, Marmelstein & Kubovcik

[57] ABSTRACT

A track-type vehicle undercarriage comprising a track frame, a carrier rail mounted on the track frame, a track rail fixedly secured to the track frame underneath thereof, a recoil device mounted on the track frame, a support member fixedly connected to the recoil device and biased forwardly thereby, a front rail rotatably mounted on the support member, a sprocket, and an endless track of linked together track shoes mounted on the carrier rail, front rail, track rail and sprocket.

3 Claims, 11 Drawing Figures

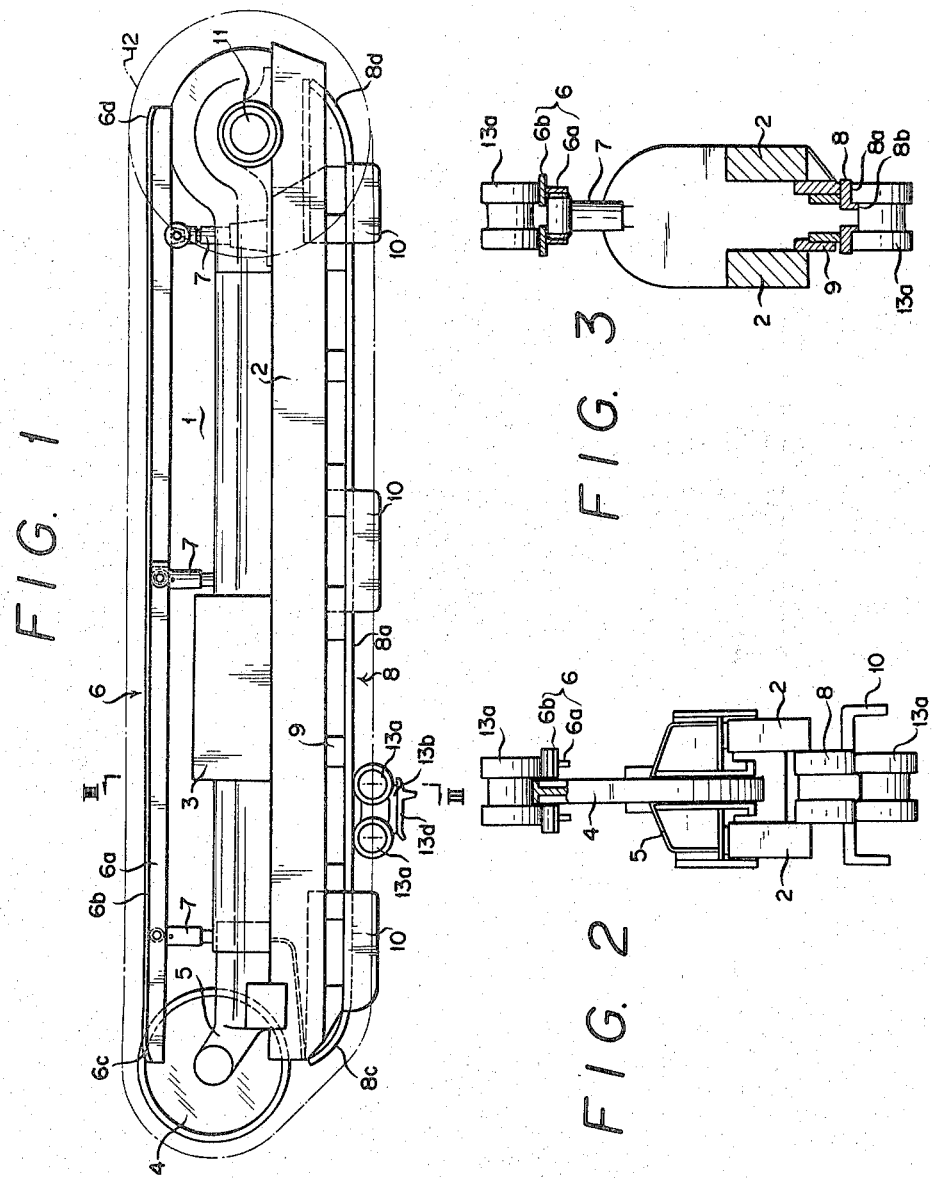

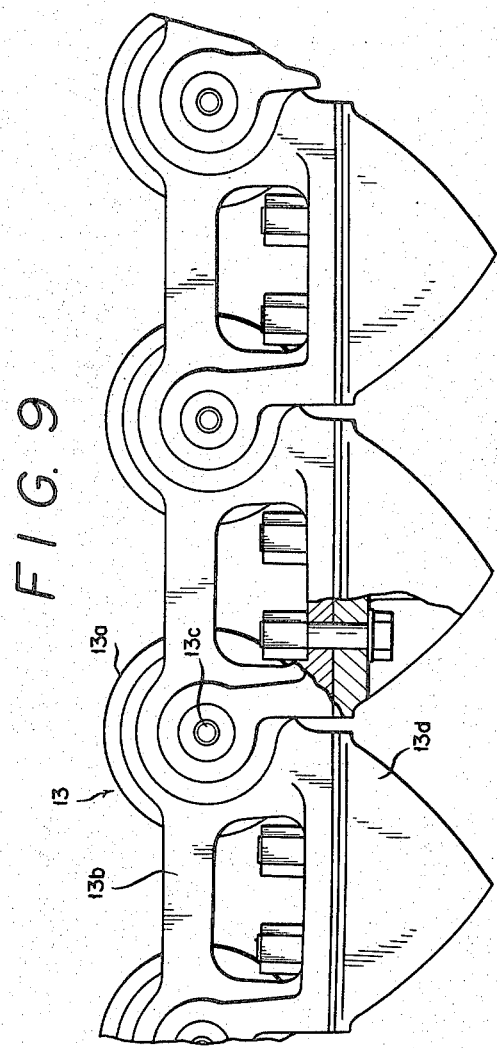
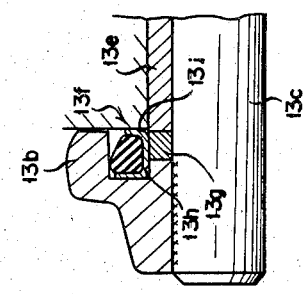

TRACK-TYPE VEHICLE UNDERCARRIAGE

BACKGROUND OF THE INVENTION

This invention relates to a track-type vehicle undercarriage and more particularly to track link assemblies provided with multiple track rollers or roller bushings.

There have been a number of proposals of track link assemblies for use with track-type vehicles wherein roller bushings are provided. In many applications, such track link assemblies provided with roller bushings are desirable in that good support for the lower run of the track link assembly when installed on a track-type vehicle is provided. In addition, through the use of rollers, track squirm may be eliminated with the rollers providing better track guidance. However, most of the prior art devices are relatively complex, including a considerable number of parts.

SUMMARY OF THE INVENTION

It is therefore an object of the present invention to provide an improved track-type vehicle undercarriage which is simple in construction and can reduce wear and noise factors generally associated with such undercarriages.

In accordance with an aspect of the present invention, there is provided a track-type vehicle undercarriage, comprising: a track frame; a carrier rail mounted on and above said track frame; a track rail mounted on said track frame underneath thereof; recoil means mounted on said track frame, said recoil means having a piston slidably mounted therein and means for biasing said piston forwardly; a support member fixedly connected to said piston; a circular shaped front rail rotatably mounted on said support member; a sprocket; an endless track of linked together track shoes mounted on said carrier rail, front rail, track rail and sprocket; and means for guiding said endless track along said carrier rail, front rail and track rail.

The above and other objects, features and advantages of the present invention will be readily apparent from the following description taken in conjunction with the accompanying drawings.

BRIEF DESCRIPTION OF THE DRAWINGS

FIG. 1 is a side elevation of a vehicle undercarriage according to the present invention;

FIG. 2 is a partially broken away front elevation of FIG. 1 with an endless track being omitted;

FIG. 3 is a cross-sectional view taken along the line III—III of FIG. 1;

FIG. 8 is a fragmentary explanational view showing the engagement of the track rollers with the sprocket from upper side;

FIG. 9 is an enlarged side elevation of a linked together endless track;

FIG. 11 is an enlarged cross-sectional view of a dust seal.

DESCRIPTION OF THE PREFERRED EMBODIMENT

Figure 4:
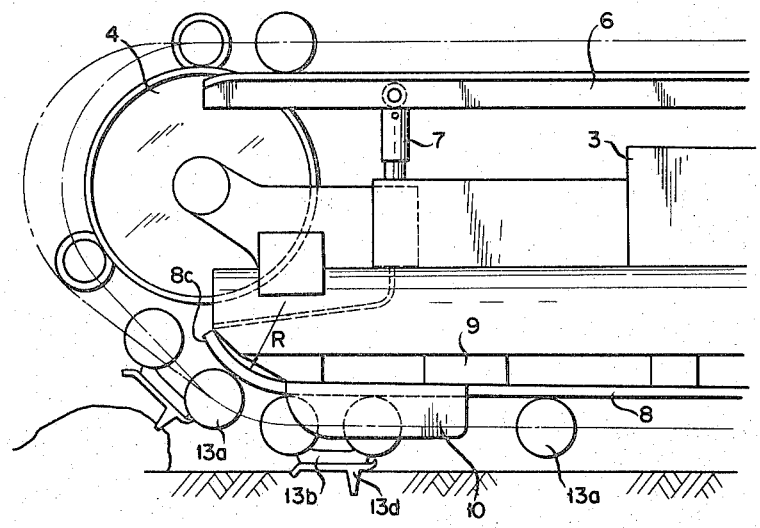
FIG. 4 is an enlarged side elevation of FIG. 1 showing a front rail in detail.
Figure 5:
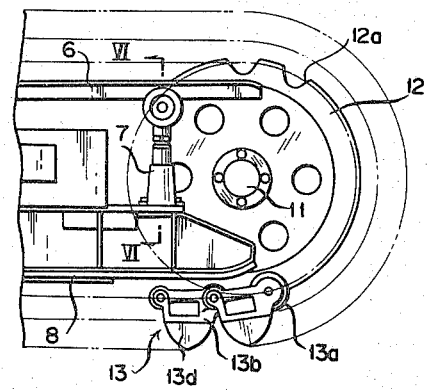
FIG. 5 is an enlarged side elevation of FIG. 1 showing a sprocket in detail.

The present invention will now be described by way of example only with reference to the accompanying drawings. Reference numeral 1 denotes an undercarriage of a track type vehicle which comprises track frames 2 mounted on a main frame (not shown) of the vehicle.

Mounted on the front portions of the track frames 2 is a front rail 4 which is biased forwardly by a recoil means 3. The front rail 4 is of an annular form and its central part is rotatably mounted to a support member 5 which is attached to the front portion of the recoil means 3 and guided by the track frames 2 in such a manner as to be moved freely in the longitudinal direction. The aforementioned recoil means 3 is mounted behind the support member 5 so as to urge the front rail 4 through the support member 5.

Mounted over and under the track frames 2 are carrier rails 6 and track rails 8 extending in parallel relationship therewith.

The carrier rails 6 comprise two lengths of T-shaped rail members 6a extending in parallel and spaced apart transversely, the upper surface of each rail member 6a forming a rolling contact surface 6b of a track roller 13a which will be mentioned later. The front and rear ends of each rolling contact surface 6b adjacent both the front rail 4 and a sprocket 12 are curved downwards as shown. The front curved portion 6c serves to move the track roller 13a which has rolled on the rolling contact surface 6b of the carrier rail 6 onto the front rail 4 without causing shock, and reversely to move the track roller 13a which has travelled on and along the front rail 4 onto the carrier rail 6. Further, the rear curved portion 6d is adapted to guide the track roller 13a smoothly during the backward running of the vehicle when the track roller 13a running on the carrier rail 6 is moved onto the sprocket 12 thereby preventing the track roller 13a from striking against the sprocket 12. Stating in more detail, as shown in FIG. 8, the rear curved portion 6d serves to support the track roller 13a until immediately before the track roller meshes with the sprocket 12 thereby preventing swinging movements of the track roller 13a. The radius of curvature of the curved portion 6d is predetermined such that the track roller 13a can get completely clear the rear curved portion 6c when the track roller 13a has meshed with the sprocket 12.

Figure 6:
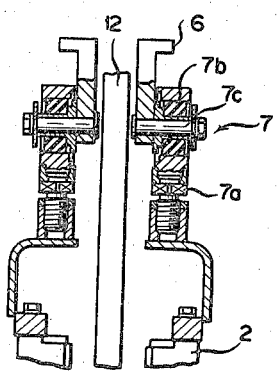
FIG. 6 is a cross-sectional view taken along the line VI—VI of FIG. 5.

Further, each of the carrier rails 6 is supported by means of elastic support means 7 at plural places. Each elastic support means 7 comprises an adjustable member 7a mounted on the upper surface of the track frame 2 and the height of which can be adjusted as desired by its screw adjustment or by grease injection, a bushing 7b made of an elastomer such as rubber or the like fitted to the upper end thereof, and a pin 7c having one end fixedly secured to the lower part of the carrier rail 6 and the other end fitted in as shown in FIG. 6. By such arrangement, the track rollers 13a which are rolled on and supported by the carrier rails 6 can be smoothly meshed with the sprocket 12 so that there is little noise arising from striking of both components and the wear of the track roller 13a and the sprocket 12 due to their relative sliding contact can be kept minimum.

Whilst, the aforementioned track rails 8 are fixedly secured to the lower surface of the track frames 2 through a plurality of fixing brackets 9 which are mounted on the lower portions of the track frames 2 at a spaced interval in the longitudinal direction.

Each of the track rails 8 has a rolling contact surface 8a formed on the lower surface thereof and which has the same width as that of the carrier rail 6, the rolling contact surface 8a being arranged so as to permit rolling movements of the track rollers 13a thereon, and a downwardly projecting strip 8b formed on the opposite portions of the rolling contact surfaces 8a. Each of the projecting strips 8b serves to guide each track roller 13a to move on and along the rolling contact surface 8a of each track rail 8. The front and rear ends of each of the track rails 8 are bent or curved upwardly and obliquely. Out of such curved portions 8c and 8d, the curved portions 8c located under the front rail 4 serve to prevent the upward thrusting forces generated by obstacles such as rocks or the like when the vehicle is climbing over them from directly acting on the front rail 4 (refer to FIG. 4). The radius of curvature of each curved portion 8c is determined so as to enable the track rollers 13a to be brought into contact with the curved portion 8c without causing any shocks. Fixedly secured to both sides of the rear portions of the curved portions 8c are underguards 10, the ends of each of which are bent downwards on both sides of the track rollers 13a. The underguards 10 are additionally fixedly secured to the approximately intermediate portion and the rear portion of the track rails 8.

Figure 10:
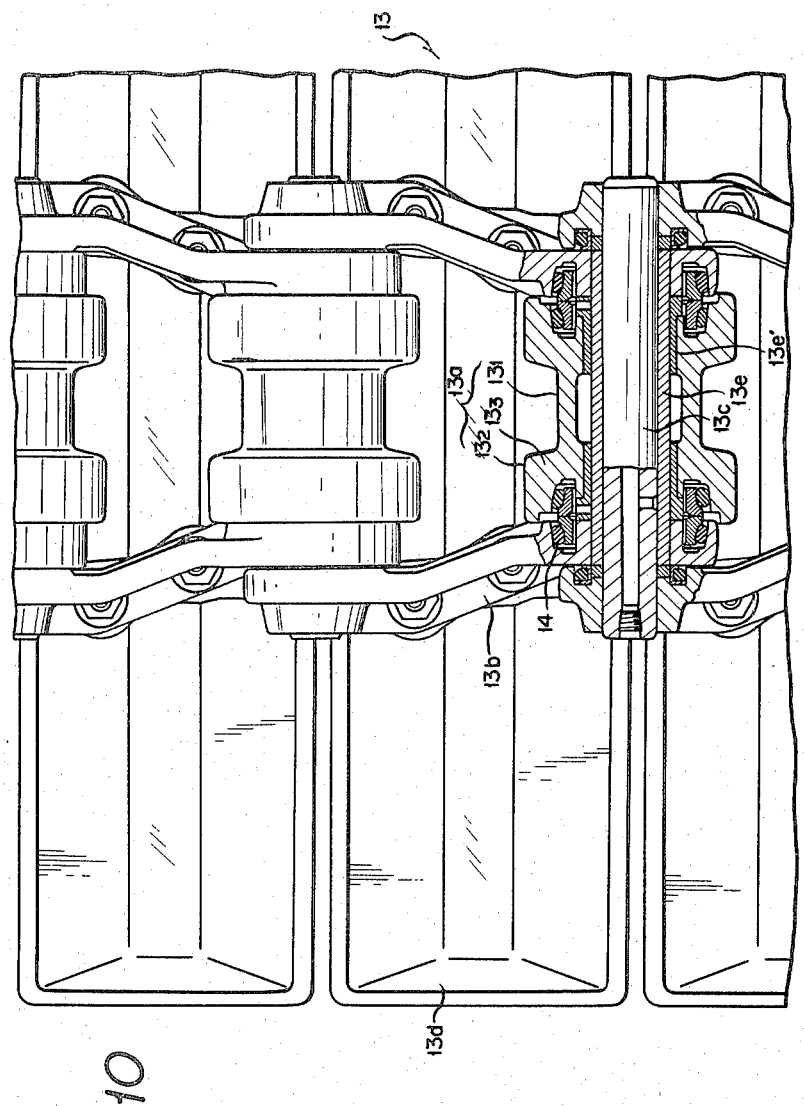
FIG. 10 is a partly cross-sectioned plan view of FIG. 9.

The rear curved portions 8d of the track rails 8 are constructed as mentioned below. In brief, mounted on the rear portions of the track frames 2 is a final drive shaft 11 projecting from both sides of the rear portion of the main frame of the vehicle not shown, and the sprockets 12 are fixedly secured to both ends of the shaft 11. The sprocket 12 has semi-circular recesses 12a formed at equal angular intervals in the circumference thereof. Annular lands $13_1$ of a small diameter of the track rollers 13a are adapted to fit in the semi-circular recesses 12a. The pitch of the recesses 12a is equal to the pitch IP between adjacent track rollers 13a of the track 13 wound around the sprocket 12 and the front rail 4. The track 13 comprises, as shown in FIGS. 9 and 10, a plurality of links 13b connected in endless configuration by pins 13c, each of the links 13b having a track shoe 13d fixedly secured to the outer surface thereof, each of the pins 13c having a first annular bushing 13e fitted from outside thereto and a pair of second annular bushings 13e' mounted on the outer peripheral surface thereof so as to rotatably carry each track roller 13a. Each of the track rollers 13a comprises, as shown in FIG. 10, raised annular flanges $13_3$ having rolling contact surfaces $13_2$ on the opposite sides of the annular land $13_1$ of a small diameter.

Lubricating oil is filled in a bore of each pin 13c, and each track roller 13a is provided with a pair of floating seals 14 for preventing entries of earth and sand into sliding contact parts. Further, as shown in FIG. 11, mounted between the end face of each bushing 13e and the end of each link 13b are a dust seal 13f and a thrust ring 13g. The thrust ring 13g is located between the end face of the bushing 13e and the link 13b so as to carry the thrust load, and the dust seal 13f is accommodated in a counterbore 13h formed in the link 13b in such a manner as to surround the outer periphery of the thrust ring 13g. A seal ring 13i is located to make sliding contact with the side face of the link 13b thereby preventing entries of earth and sand through each link 13b. By such arrangement, as compared with the prior art device in which the thrust ring 13g and the dust seal 13f are mounted in juxtaposition, the distance between the end face of the first annular bushing 13e and the link 13b can now be reduced and so the size of the fitting part of each link 13b can be increased. Therefore, the idle play of the whole links 13b can be reduced so that the durability of the links can be improved, and at the same time, the bending strength of the pins 13c per se can be improved.

When the track rollers 13a mesh with the semi-circular shaped recesses 12a of the sprocket 12, the track rollers 13a are guided by the rear curved portions 8d of the track rails 8 in such a manner as mentioned below.

Figure 7:
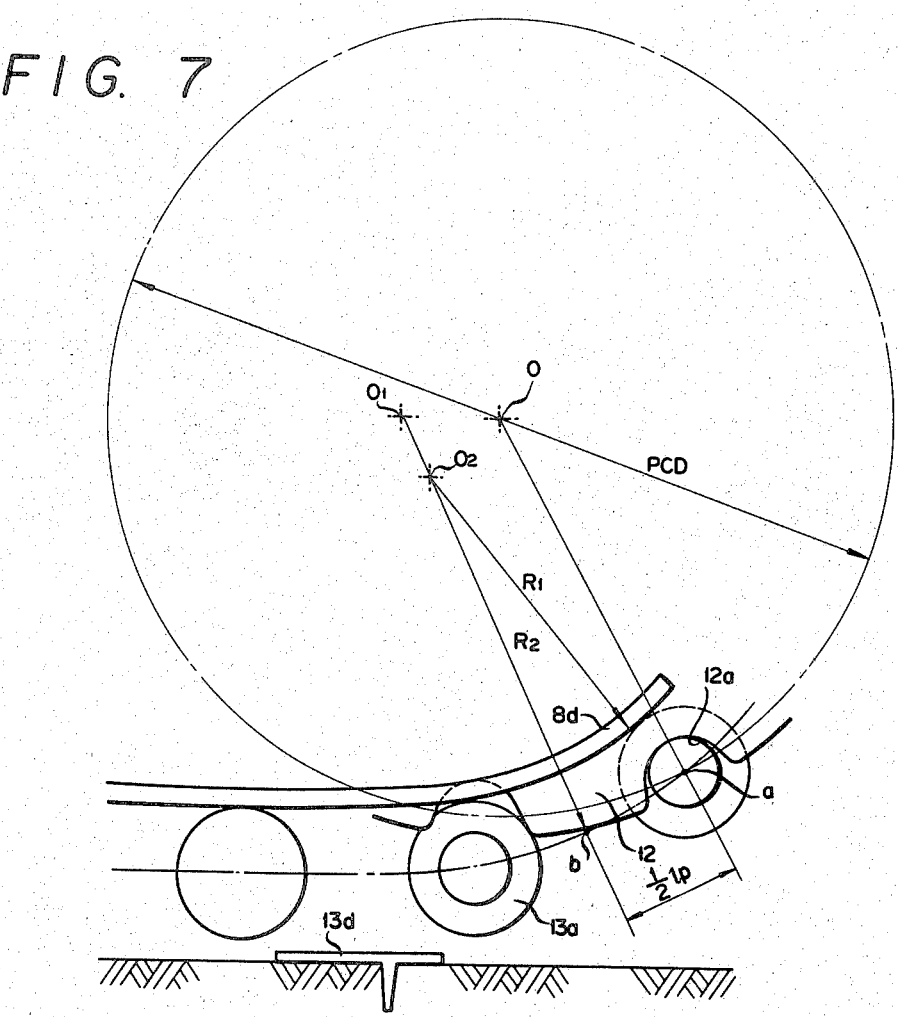
FIG. 7 is an enlarged fragmentary explanational view showing the engagement of the track rollers with the sprocket from lower side.

As shown in FIG. 7, the center $O_1$ of orbit of the track rollers 13a is located slightly forwards of the center O of the sprocket 12, and the center $O_2$ of the rear curved portion 8d is located on a line connecting the center $O_1$ and a point "b" which is spaced forwardly apart by half the pitch IP of the track rollers 13a from a point "a" where the pitch circle of the sprocket 12 crosses the track of the track rollers 13a with a radius $R_2$. The curved portion 8d is curved upwardly and obliquely at a radius of curvature $R_1$ with its center at $O_2$ which is smaller than the above-mentioned radius $R_2$. By such arrangement, the track roller 13a which has reached just under the vertical center line of the sprocket 12 will gradually move close to the recess 12a of the sprocket 12 while rolling on the rolling contact surface 8a of the curved portion 8d. At the point "a" where the track or orbit of the track rollers 13a crosses the pitch circle of the recesses 12a of the sprocket 12, the annular land $13_1$ of a small diameter of the track roller 13a will mesh with the recess 12a of the sprocket 12. Further, at the position where the track shoe 13d has gotten completely clear the road surface, the track roller 13a meshes with the sprocket 12 so that no upward external force is exerted on the final drive shaft 11 of the sprocket 12. In addition thereto, after the track roller 13a has gotten clear the curved portion 8d, the annular land $13_1$ meshes with the recess 12a so that there is no relative sliding contact arising between the annular land $13_1$ and the recess 12a by the action of the freely rotatable track rollers 13a. Therefore, prevention of wear of the annular lands $13_1$ and the recesses 12a can be achieved.

As mentioned in detail hereinabove, according to the present invention, since the carrier rails and the track rails are mounted over and under the track frames so as to guide the rolling movements of the track rollers fitted to the links of the track, there is little noise arising from unnecessary swinging movements of the tracks during the running of the vehicle, and the power loss can be reduced by the smooth movements of the tracks, and consequently, the performance of traction of the vehicle can also be improved.

It is to be understood that the foregoing description is merely illustrative of a preferred embodiment of the present invention, and that the scope of the invention is not to be limited thereto, but is to be determined by the scope of the appended claims.

What we claim is:

1. A track-type vehicle undercarriage comprising:
   a track frame;
   recoil means mounted on said track frame, said recoil means having a piston slideably mounted therein and means for biasing said piston forwardly;

a support member fixedly connected to said piston;
a front rail rotatably mounted on said support member;
a sprocket rotatably mounted on said track frame,
said sprocket having a plurality of semi-circular recesses formed at equal angular intervals in the circumference thereof, a center axis of rotation, and a pitch radius;
a carrier rail mounted on and above said track frame, said carrier rail having a front end terminating adjacent and above said front rail and a rear end terminating adjacent and above said sprocket, each end having a downwardly curved portion;
a track rail mounted on said track frame underneath thereof, said track rail having a front end terminating adjacent and below said front rail and a rear end terminating adjacent and below said sprocket, each end having an upwardly curved portion; and
an endless track of linked together track shoes mounted on said carrier rail, front rail, track rail, and sprocket, each of said track shoes being linked together by an elongated pin having opposite ends, said pins being spaced a certain pitch from each other, each pin having rotatably mounted thereon a track roller comprising a pair of raised annular flanges at both ends thereof and an annular land section of a small diameter located between said flanges, said semi-circular recesses of said sprocket receiving said annular land sections, the ends of said carrier rail and track rail permitting smooth travel of the endless track between the front rail, track rail, sprocket and carrier rail;
said curved portion of said rear end of said track rail having an upward curvature such that a center of orbit of said track rollers is located slightly forwardly of said center axis of said sprocket and a center of said curvature is located on a line connecting said center of orbit with a point spaced forwardly apart by half of said pitch from a second point where a pitch circle of said sprocket crosses said orbit at said pitch radius, said curvature having a radius less than said pitch radius.

2. A track type vehicle undercarriage as recited in claim 1 wherein said carrier rail comprises a pair of rail members each having a rolling contact surface formed thereon and said track rail comprises a pair of rail members each having a rolling contact surface formed thereon whereby said track rollers are rolled on said carrier and track rails with said raised annular flanges engaging with said respective rolling contact surfaces of said carrier and track rails.

3. A track-type vehicle undercarriage as recited in claim 1 or 2 further comprising an annular bushing rotatably mounted on said pin and having opposite ends, first and second links connected to the opposite ends of said pin and spaced apart by said bushing, third and fourth links connected to the opposite ends of said bushing and spaced apart by said track roller, a first pair of resilient seal means for sealing the opposite ends of said bushing between said first and second links, and a second pair of floating seal means for sealing the opposite ends of said track roller between said third and fourth links.

* * * * *